United States Patent
Lee et al.

(10) Patent No.: US 11,149,120 B2
(45) Date of Patent: *Oct. 19, 2021

(54) METHOD FOR MANUFACTURING THERMOPLASTIC POLYMER PARTICLES

(71) Applicant: LG Hausys, Ltd., Seoul (KR)

(72) Inventors: Hee-Jung Lee, Seoul (KR); Sung Yong Kang, Seoul (KR); Kyoung Min Kang, Seoul (KR); Min Gyung Kim, Seoul (KR); Chang-Young Park, Seoul (KR); Jae Ho Lim, Seoul (KR); Jun Ho Choi, Seoul (KR); Jae Han Song, Seoul (KR); Yu Jin Go, Seoul (KR)

(73) Assignee: LG Hausys, Ltd.

( * ) Notice: Subject to any disclaimer, the term of this patent is extended or adjusted under 35 U.S.C. 154(b) by 76 days.

This patent is subject to a terminal disclaimer.

(21) Appl. No.: 16/491,859

(22) PCT Filed: Mar. 9, 2018

(86) PCT No.: PCT/KR2018/002846
§ 371 (c)(1),
(2) Date: Sep. 6, 2019

(87) PCT Pub. No.: WO2018/164541
PCT Pub. Date: Sep. 13, 2018

(65) Prior Publication Data
US 2020/0316819 A1    Oct. 8, 2020

(30) Foreign Application Priority Data

Mar. 9, 2017    (KR) .................. 10-2017-0030178
Mar. 9, 2017    (KR) .................. 10-2017-0030179
(Continued)

(51) Int. Cl.
*B29B 9/10*    (2006.01)
*B01J 2/04*    (2006.01)
(Continued)

(52) U.S. Cl.
CPC . *C08J 3/12* (2013.01); *B01J 2/04* (2013.01); *B01J 2/20* (2013.01); *B29B 9/10* (2013.01);
(Continued)

(58) Field of Classification Search
CPC .................. B01J 2/02; B01J 2/04; B29B 9/10
See application file for complete search history.

(56) References Cited

U.S. PATENT DOCUMENTS 3,647,340 A     3/1972  Sakurai et al.
3,937,772 A *   2/1976  Urban ................... B29C 48/00
                                                          264/12

(Continued)

FOREIGN PATENT DOCUMENTS

DE    102007027543 A1    5/2008
EP       1707257 A2     10/2006
(Continued)

OTHER PUBLICATIONS

Database WPI, Week 200020, Feb. 22, 2000 (Feb. 22, 2000), Thomson Scientific, London. GB; AN 2000-232139, XP002801299, 2 pages.
(Continued)

*Primary Examiner* — Mary Lynn F Theisen
(74) *Attorney, Agent, or Firm* — Lerner, David, Littenberg, Krumholz & Mentlik, LLP

(57) ABSTRACT

Provided is a method for manufacturing thermoplastic polymer particles, the method comprising the steps of: supplying a thermoplastic polymer resin to an extruder and extruding the same; supplying the extruded thermoplastic polymer resin and air to a nozzle, bringing the thermoplastic polymer resin into contact with the air to granulate the thermoplastic polymer resin, and then discharging the granulated thermoplastic polymer resin; and supplying discharged thermoplastic polymer particles to a cooling unit to cool the thermo-
(Continued)

plastic polymer particles, and then collecting the cooled thermoplastic polymer particles.

8 Claims, 2 Drawing Sheets

(30) Foreign Application Priority Data

Sep. 18, 2017 (KR) .................. 10-2017-0119588
Mar. 8, 2018 (KR) .................. 10-2018-0027666

(51) Int. Cl.
*C08J 3/12* (2006.01)
*C08L 67/04* (2006.01)
*C08G 63/06* (2006.01)
*B01J 2/20* (2006.01)
*B29B 9/12* (2006.01)
*B29K 67/00* (2006.01)

(52) U.S. Cl.
CPC .............. *C08G 63/06* (2013.01); *C08L 67/04* (2013.01); *B29B 2009/125* (2013.01); *B29K 2067/046* (2013.01); *C08J 2367/04* (2013.01); *C08J 2375/04* (2013.01); *C08L 2203/30* (2013.01)

(56) References Cited

U.S. PATENT DOCUMENTS

| | | | |
|---|---|---|---|
| 5,525,274 | A | 6/1996 | Grimmer |
| 5,609,979 | A | 3/1997 | Lawson |
| 6,190,773 | B1 | 2/2001 | Imamura et al. |
| 6,527,995 | B1 | 3/2003 | Kaufhold et al. |
| 6,733,845 | B1 | 5/2004 | Caramaro et al. |
| 8,710,144 | B2 | 4/2014 | Hesse et al. |
| 2002/0099162 | A1 | 7/2002 | Iwanaga et al. |
| 2005/0142206 | A1 | 6/2005 | Brown et al. |
| 2005/0207931 | A1 | 9/2005 | Hesse et al. |
| 2006/0067895 | A1 | 3/2006 | Miyamoto et al. |
| 2006/0204604 | A1 | 9/2006 | Yamanaka et al. |
| 2006/0235188 | A1 | 10/2006 | Weinhold et al. |
| 2008/0026955 | A1 | 1/2008 | Munoz et al. |
| 2008/0103277 | A1 | 5/2008 | Campbell et al. |
| 2008/0122132 | A1* | 5/2008 | Kinoshita ............... B01J 2/20 264/12 |
| 2008/0152910 | A1 | 6/2008 | Hesse et al. |
| 2009/0280423 | A1 | 11/2009 | Yahiro et al. |
| 2010/0133717 | A1 | 6/2010 | Boczon et al. |
| 2010/0227985 | A1 | 9/2010 | Nishiguchi et al. |
| 2012/0270048 | A1 | 10/2012 | Saigusa et al. |
| 2013/0234350 | A1* | 9/2013 | Osswald ............... B29C 48/142 264/12 |
| 2013/0289055 | A1 | 10/2013 | Boit et al. |
| 2013/0309497 | A1 | 11/2013 | Takezaki et al. |
| 2014/0024797 | A1 | 1/2014 | Nishiguchi et al. |
| 2015/0240021 | A1 | 8/2015 | Hesse et al. |
| 2016/0208057 | A1 | 7/2016 | Baer et al. |
| 2016/0208070 | A1 | 7/2016 | Shin et al. |
| 2017/0291996 | A1 | 10/2017 | Hwang et al. |
| 2018/0133685 | A1* | 5/2018 | Lu ............... B01J 20/286 |
| 2019/0276611 | A1 | 9/2019 | Kuwagaki et al. |
| 2020/0032005 | A1 | 1/2020 | Kim et al. |
| 2020/0032049 | A1 | 1/2020 | Kang et al. |
| 2020/0071470 | A1 | 3/2020 | Lim et al. |
| 2020/0316819 | A1 | 10/2020 | Lee et al. |

FOREIGN PATENT DOCUMENTS

| | | | |
|---|---|---|---|
| EP | 1920825 | A1 | 5/2008 |
| EP | 2732945 | A1 | 5/2014 |
| EP | 3202824 | A1 | 8/2017 |
| JP | S59226024 | A | 12/1984 |
| JP | 2000007789 | A | 1/2000 |
| JP | 2000052341 | A | 2/2000 |
| JP | 2000313729 | A | 11/2000 |
| JP | 2001288273 | A | 10/2001 |
| JP | 2002283341 | A | 10/2002 |
| JP | 2004269598 | A | 9/2004 |
| JP | 2004269865 | A | 9/2004 |
| JP | 2005097480 | A | 4/2005 |
| JP | 2006002097 | A | 1/2006 |
| JP | 2006124366 | A | 5/2006 |
| JP | 2007535585 | A | 12/2007 |
| JP | 2008070583 | A | 3/2008 |
| JP | 2008137377 | A | 6/2008 |
| JP | 2008163290 | A | 7/2008 |
| JP | 2009029860 | A | 2/2009 |
| JP | 2009035606 | A | 2/2009 |
| JP | WO2009051104 | A1 | 3/2011 |
| JP | 2012224809 | A | 11/2012 |
| JP | 2014504305 | A | 2/2014 |
| JP | 2014047304 | A | 3/2014 |
| JP | 2016536412 | A | 11/2016 |
| JP | 2016536420 | A | 11/2016 |
| JP | 2018135493 | A | 8/2018 |
| KR | 20000073060 | A | 12/2000 |
| KR | 20010031742 | A | 4/2001 |
| KR | 20010049784 | A | 6/2001 |
| KR | 20070068490 | A | 6/2007 |
| KR | 101292498 | B1 | 8/2013 |
| KR | 201501117782 | A | 10/2015 |
| KR | 20150126517 | A | 11/2015 |
| WO | 2016052935 | A1 | 4/2016 |
| WO | 2016052958 | A1 | 4/2016 |

OTHER PUBLICATIONS

Database WPI, Week 201602, Nov. 12, 2015 (Nov. 12, 2015), Thomson Scientific, London, GB; AN 2015-71562P, XP002801284, 2 pages.
Database WPI, Week 201629, Apr. 7, 2016 (Apr. 7, 2016), Thomson Scientific, London, GB; AN 2016-20784P, XP002801283, 4 pages.
Extended European Search Report with Written Opinion for Application No. 18763304.5 dated Dec. 14, 2020, 14 pages.
Extended European Search Report with Written Opinion for Application No. 18763568.5 dated Dec. 11, 2020, 19 pages.
International Search Report for PCT/KR2018/002846 dated Jul. 24, 2018.
Anonymous, "Hot Cutting PP/PE Plastic Recycling Machine Air Cooled plastic granulator machine," Dec. 22, 2016, pp. 1-2, XP055744893.
Extended European Search Report with Written Opinion for Application No. 18764218.6 dated Nov. 20, 2020, 11 pages.
Vasanthavada et al, "Application of Melt Granulation Technology Using Twin-screw Extruder in Development of High-dose Modified-release Tablet Formulation", Journal of Pharmaceutical Sciences, May 23, 2011, pp. 1923-1934, vol. 100, No. 5, XP055128566.
International Search Report for Application No. PCT/KR2018/002843, dated Jul. 24, 2018, pp. 1-2.
International Search Report for Application No. PCT/KR2018/002845, dated Jul. 24, 2018, pp. 1-4.
International Search Report for PCT/KR2018/002848 dated Jun. 28, 2018.

* cited by examiner

[Figure 1]
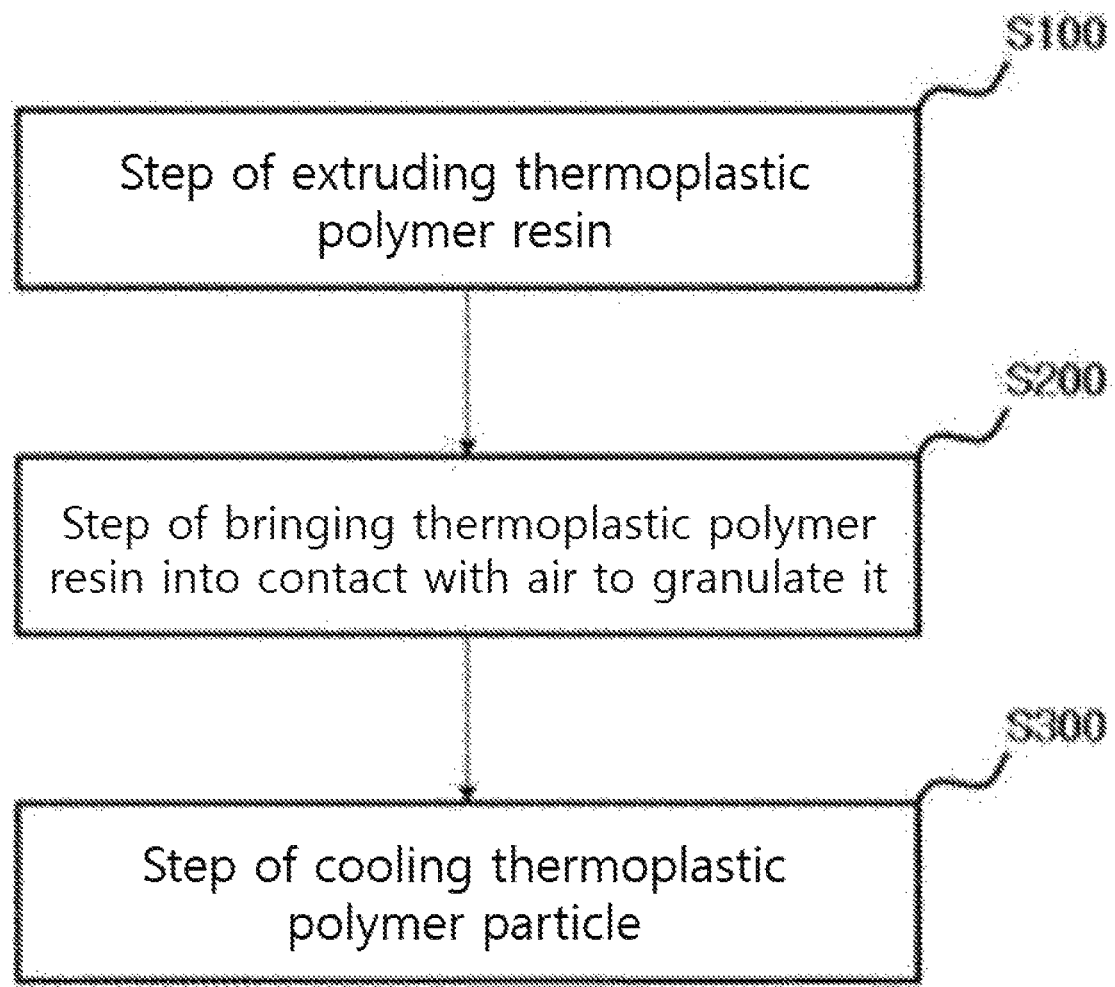

【Figure 2】
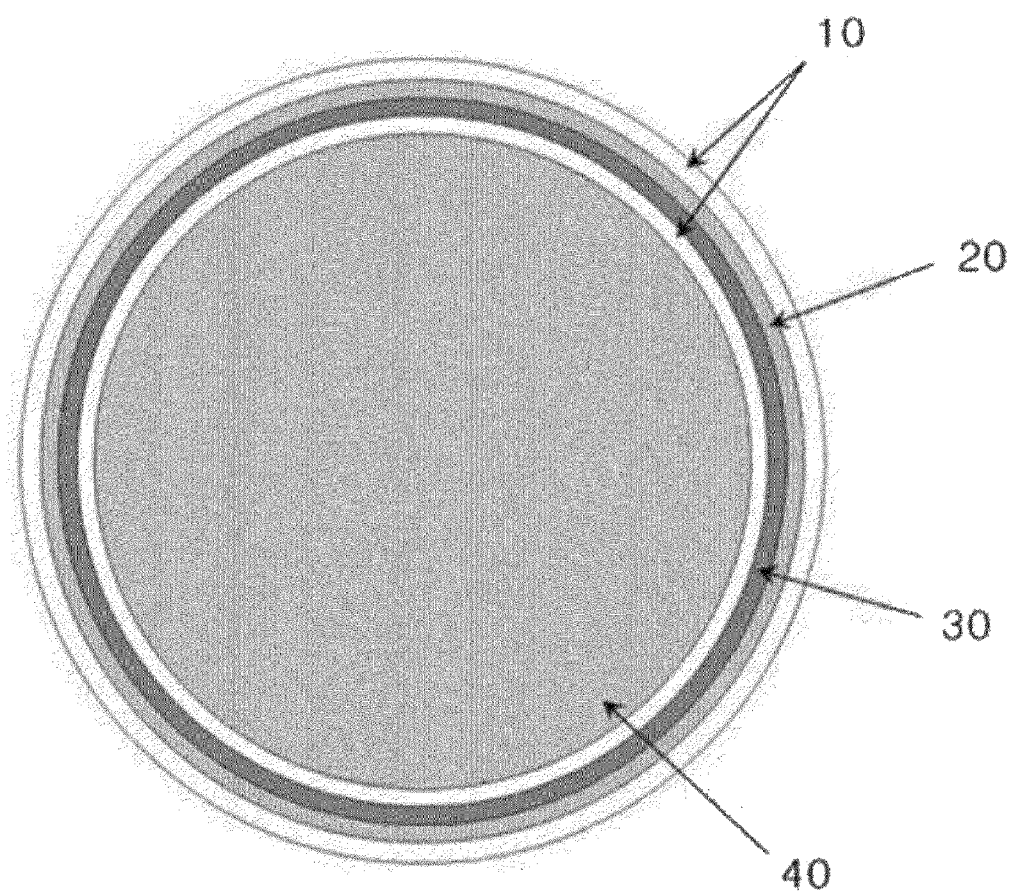

METHOD FOR MANUFACTURING THERMOPLASTIC POLYMER PARTICLES

CROSS-REFERENCE TO RELATED APPLICATIONS

This application is a national phase entry under 35 U.S.C. § 371 of International Application No. PCT/KR2018/002846, filed Mar. 9, 2018, which claims the benefits of priorities based on Korean Patent Application Nos. 10-2017-0030178 and 10-2017-0030179, filed on Mar. 9, 2017, Korean Patent Application No. 10-2017-0119588, filed on Sep. 18, 2017, and Korean Patent Application No. 10-2018-0027666, filed on Mar. 8, 2018, the entire contents of which are incorporated herein by reference.

TECHNICAL FIELD

The present invention relates to a manufacturing method of the thermoplastic polymer particles.

BACKGROUND ART

Polymer resins in the form of particles are used in various ways throughout the industry. Such polymer resin particles are manufactured through a process of granulating a polymer resin raw material.

In general, as a manufacturing method of thermoplastic polymer particles, there are a crushing method represented by a freeze-crushing method; a solvent dissolution-precipitation method which makes it precipitate by dissolving in a high temperature solvent and then cooling or which makes it precipitate by dissolving in a solvent and then adding a bad solvent; a melt kneading method which obtains thermoplastic resin particles by mixing the thermoplastic resin and the incompatible resin in the mixer to form a composition having the thermoplastic resin in the dispersed phase and the thermoplastic resin and the incompatible resin in the continuous phase, and then removing the incompatible resin; and the like.

If the particles are manufactured by the crushing method, there is a problem that it is difficult to secure the particles uniformity of the manufactured thermoplastic polymer resin particles. In addition, the crushing method requires a high cost compared to the particle obtaining process because liquid nitrogen is used during cooling. If a compounding process for adding pigments, antioxidants, etc. to the raw material of the thermoplastic polymer resin is added, since the process proceeds batchwise, the productivity is low as compared to that of the continuous particle obtaining process. If the particles are manufactured by the solvent dissolution precipitation method and the melt kneading method, there is a problem that in addition to the thermoplastic resin particles, other components such as a solvent may be detected as impurities. When impurities are incorporated in the process, it is not only difficult to produce particles purely made of only a thermoplastic polymer resin, but also highly susceptible to deformation of physical properties and shapes of the particles, and also it is difficult to control them finely.

Therefore, there is a need in the art for a manufacturing method of thermoplastic polymer particles that can improve the above problems.

PRIOR ART DOCUMENT

Patent Document (Patent Document 1) Japanese Laid-open Patent Publication No. 2001-288273

(Patent Document 2) Japanese Laid-open Patent Publication No. 2000-007789

(Patent Document 3) Japanese Laid-open Patent Publication No. 2004-269865

DISCLOSURE

Technical Problem

The present invention is to provide a manufacturing method of the thermoplastic polymer particles having physical properties which effectively prevent the incorporation of impurities other than the resin component in the particles by extruding a thermoplastic polymer resin, granulating the extruded resin by contact with air, and cooling it to manufacture thermoplastic polymer particles, and which can be controlled so that the particles have physical properties that can be widely utilized.

Technical Solution

According to a first aspect of the invention, the present invention provides a method for manufacturing thermoplastic polymer particles comprising: supplying a thermoplastic polymer resin to an extruder and extruding it; supplying the extruded thermoplastic polymer resin and air to the nozzle, bringing the thermoplastic polymer resin into contact with the air to granulate the thermoplastic polymer resin and then discharging granulated thermoplastic polymer resins; and supplying the discharged thermoplastic polymer particles to a cooling unit to cool the thermoplastic polymer particles, and then collecting cooled thermoplastic polymer particles.

In one embodiment of the present invention, when supplying the extruded thermoplastic polymer resin and air to the nozzle, the air is supplied to the center and the outer portion based on the cross section of the nozzle, and the extruded thermoplastic polymer resin is supplied between the center and the outer portion to which the air is supplied In one embodiment of the present invention, the ratio of the cross-sectional areas of the air supplied to the outer portion and the extruded thermoplastic polymer resin supplied between the central portion and the outer portion to which the air is supplied is 1:1 to 10:1 based on the cross section at the outlet of the nozzle.

In one embodiment of the present invention, the distal end of the nozzle is maintained at a temperature calculated by Formula below:

$$\text{Distal end temperature} = \text{glass transition temperature } (T_g) + (\text{pyrolysis temperature } (T_d) - \text{glass transition temperature } (T_g)) \times A, \quad \text{[Formula]}$$

wherein the glass transition temperature and the pyrolysis temperature are values for thermoplastic polymer, and A is 0.5 to 1.5.

Advantageous Effects

The manufacturing method of thermoplastic polymer particles according to the present invention can uniformly and effectively control physical properties such as the size and shape of the particles without any additional ingredients besides the thermoplastic polymer resin, which is a raw material, and air.

Therefore, in the particles produced by the manufacturing method according to the present invention, impurities other than thermoplastic polymer in the particles are effectively excluded, the internal physical properties as well as the external physical properties have been improved to facilitate processing when the particles are applied to products in various fields.

DESCRIPTION OF DRAWINGS

FIG. 1 is a process flow chart schematically showing a method for manufacturing thermoplastic polymer particles according to the present invention.

FIG. 2 is a cross-sectional view of a nozzle outlet showing a supply position of a thermoplastic polymer resin and air to a nozzle according to an embodiment of the present invention.

BEST MODE

Embodiments provided according to the present invention can all be achieved by the following description. It is to be understood that the following description describes preferred embodiments of the invention, and the invention is not necessarily limited thereto.

In the following specification, for the numerical range, the expression "to" is used to include both the upper and lower limits of the range, and when not including the upper limit or the lower limit, the expression "less than", "more than", "no more than", or "no less than" is used in order to specifically indicate whether or not to include the upper limit or the lower limit.

The present invention provides a manufacturing method of thermoplastic polymer particles, which granulates by bringing a thermoplastic polymer resin, whose physical properties are controlled by temperature and pressure, into contact with air, without the addition of additional components such as solvent. FIG. 1 schematically illustrates a process flow diagram for the manufacturing method. The manufacturing method comprises supplying a thermoplastic polymer resin to an extruder and extruding it (S100); supplying the extruded thermoplastic polymer resin and air to the nozzle, bringing the thermoplastic polymer resin into contact with the air to granulate the thermoplastic polymer resin and then discharging granulated thermoplastic polymer resins (S200); and supplying the discharged thermoplastic polymer particles to a cooling unit to cool the thermoplastic polymer particles, and then collecting cooled thermoplastic polymer particles (S300). Hereinafter, each step of the manufacturing method will be described in detail. In step (S200), the discharging angle of the thermoplastic polymer resin from the nozzle is 10 to 60°.

In order to manufacture thermoplastic polymer particles according to the present invention, first, a thermoplastic polymer resin as a raw material is supplied to an extruder and extruded. By extruding the thermoplastic polymer resin, the thermoplastic polymer resin has physical properties suitable for processing particles in the nozzle. The thermoplastic polymer resin used as a raw material is not particularly limited as long as it is a substance that can be granulated according to the manufacturing method of the present invention, but preferably may preferably have a weight average molecular weight of 10,000 to 200,000 g/mol in consideration of appropriate physical properties of the prepared particles. According to one embodiment of the present invention, the thermoplastic polymer resin may be at least one polymer resin selected from the group consisting of polylactic acid (PLA), polyurethane (TPU), polyethylene (PE), polypropylene (PP), polyether sulfone (PES), poly (methyl methacrylate)(PMMA) and ethylene vinyl-alcohol copolymer (EVOH).

The extruder supplied with the thermoplastic polymer resin controls physical properties such as the viscosity of the thermoplastic polymer resin by heating and pressing the thermoplastic polymer resin. The type of extruder is not particularly limited as long as it can adjusted to have physical properties suitable for granulation at the nozzle. According to one embodiment of the present invention, the extruder may be a twin-screw extruder for efficient extrusion. The inside of the extruder may be preferably maintained at 150 to 450° C., preferably 170 to 400° C., more preferably 200 to 350° C. If the internal temperature of the extruder is less than 150° C., the viscosity of the thermoplastic polymer resin is high, which is not suitable for granulation at the nozzle, and also the thermoplastic polymer resin has low flowability in the extruder, thereby being not efficient for extrusion. In addition, if the internal temperature of the extruder is higher than 450° C., the flowability of the thermoplastic polymer resin is high, and thus efficient extrusion is possible, but if the thermoplastic polymer resin is granulated in the nozzle, it is difficult to control fine physical properties.

The extrusion amount of the thermoplastic polymer resin may be set to facilitate the physical properties of the thermoplastic polymer resin in consideration of the size of the extruder. According to one embodiment of the present invention, the thermoplastic polymer resin is extruded at a rate of 1 to 10 kg/hr. The viscosity of the extruded thermoplastic polymer resin may be 0.5 to 20 Pa·s, preferably 1 to 15 Pa·s, more preferably 2 to 10 Pa·s. If the viscosity of the thermoplastic polymer resin is less than 0.5 Pa·s, it is difficult to process the particles at the nozzle. If the viscosity of the thermoplastic polymer resin is more than 20 Pa·s, the flowability of the thermoplastic polymer resin at the nozzle is low, and thus the processing efficiency is lowered. The temperature of the extruded thermoplastic polymer resin may be 150 to 450° C.

The extruded thermoplastic polymer resin is supplied to the nozzle in the extruder. Along with the thermoplastic polymer resin, air is also supplied to the nozzle. The air contacts the thermoplastic polymer resin in the nozzle to granulate the thermoplastic polymer resin. Hot air is supplied to the nozzle to properly maintain the physical properties of the thermoplastic polymer resin. According to one embodiment of the present invention, the temperature of the air may be 250 to 600° C., preferably 270 to 500° C., more preferably 300 to 450° C. If the temperature of the air is less than 250° C. or more than 600° C., when thermoplastic polymer particles are produced from thermoplastic polymer resin, the physical properties of the surface in contact with air may be changed in an undesirable direction, which causes a problem. In particular, when the temperature of the air exceeds 600° C., excessive heat is supplied to the contact surface with the air, the decomposition phenomenon of the polymer may occur on the surface of the particles.

The supply position of the thermoplastic polymer resin and the air supplied to the nozzle is set such that the thermoplastic polymer particles can have an appropriate size and shape, and the formed particles can be evenly dispersed. FIG. 2 shows a cross-sectional view of the nozzle outlet, and the supply position of the thermoplastic polymer resin and air according to an embodiment of the present invention will be described in detail with reference to FIG. 2. For the detailed description herein, the positions of the nozzles are expressed as "inlet", "outlet", and "distal end". The "inlet" of the nozzle means the position where the nozzle starts, and the "outlet" of the nozzle means the position where the nozzle ends. In addition, the "distal end" of the nozzle means the position from two thirds of the nozzle to the outlet. Here, point 0 of the nozzle is the inlet of the nozzle and point 1 of the nozzle is the outlet of the nozzle.

As shown in FIG. 2, the cross-section perpendicular to the flow direction of thermoplastic polymer resin and air is a circle. The air is supplied through a first air stream (40) fed into the center of the circle and a second air stream (20) fed into the outer portion of the circle, and the thermoplastic polymer resin is supplied between the first air stream (40) and the second air stream (20). From the time the thermoplastic polymer resin and the air are supplied to the inlet of the nozzle to just before the outlet of the nozzle, each feed stream (the thermoplastic polymer resin stream (30), the first air stream (40) and the second air stream (20)) is separated by the internal structure of the nozzle. Just before the outlet of the nozzle, the thermoplastic polymer resin stream and the second air stream are merged to bring the thermoplastic polymer resin into contact with air, thereby granulating the thermoplastic polymer resin. In contrast, the first air stream is separated by the internal structure of the nozzle from the thermoplastic polymer resin stream and the second air stream until the air and the thermoplastic polymer resin are discharged from the nozzle. The first air stream serves to prevent the particles of the thermoplastic polymer resin granulated by the second air stream from adhering to the outlet of the nozzle and evenly disperse the discharged particles after discharging from the nozzle and before feeding to the cooling unit.

The extruded thermoplastic polymer resin in the extruder is all supplied to the above-mentioned position of the nozzle, the flow rate of air supplied to the nozzle can be adjusted depending on the flow rate of the extruded thermoplastic polymer resin. According to one embodiment of the present invention, the air is supplied to the nozzle at a flow rate of 1 to 300 m³/hr, preferably 30 to 240 m³/hr, more preferably 60 to 180 m³/hr. The air is supplied separately into the first air stream and the second air stream within the flow rate range of the air. As described above, the thermoplastic polymer resin is granulated by the second air stream. The ratio of the thermoplastic polymer resin and the second air stream as well as the temperature of the second air stream may determine the physical properties of the particles. According to one embodiment of the present invention, the ratio of the cross-sectional areas of the second air stream and the thermoplastic polymer resin based on the cross section of the outlet of the nozzle may be 1:1 to 10:1, preferably 1.5:1 to 8:1, more preferably 2:1 to 6:1. If the ratio of the second air stream and the thermoplastic polymer resin is controlled within the above range, thermoplastic polymer particles having a suitable size and shape that have high utility can be manufactured.

Since the thermoplastic polymer resin is granulated at the nozzle, the inside of the nozzle is controlled to a temperature suitable for granulating the thermoplastic polymer resin. Since a sharp rise in temperature can change the structure of the polymer in the thermoplastic polymer resin, the temperature from the extruder to the outlet of the nozzle can be raised step by step. Therefore, the internal temperature of the nozzle is set on average to a range higher than the internal temperature of the extruder. Since the distal end temperature of the nozzle is defined separately below, the internal temperature of the nozzle herein means the average temperature of the rest of the nozzle except for the distal end of the nozzle unless otherwise specified. According to one embodiment of the present invention, the inside of the nozzle may be maintained at 250 to 450° C. If the internal temperature of the nozzle is less than 250° C., sufficient heat is not transferred to the thermoplastic polymer resin to satisfy the physical properties. If the internal temperature of the nozzle is above 450° C., excessive heat can be supplied to the thermoplastic polymer resin, thereby changing the structure of the polymer.

The distal end of the nozzle may be maintained at a temperature higher than the average temperature inside the nozzle to improve the external and internal physical properties of the resulting particles. The distal end temperature of the nozzle may be determined between the glass transition temperature ($T_g$) and the pyrolysis temperature ($T_d$) of the thermoplastic polymer, and specifically may be determined according to Formula below:

Distal end temperature=glass transition temperature ($T_g$)+(pyrolysis temperature ($T_d$)−glass transition temperature ($T_g$))×$A$, [Formula]

wherein $A$ may be 0.5 to 1.5, preferably 0.65 to 1.35, more preferably 0.8 to 1.2. If $A$ is less than 0.5, it is difficult to expect the improvement of the external and internal physical properties of the particles according to the temperature rise at the distal end of the nozzle. If $A$ is greater than 1.5, the heat substantially transmitted to the thermoplastic polymer at the distal end of the nozzle may be excessively increased, thereby deforming the structure of the thermoplastic polymer. The glass transition temperature and pyrolysis temperature may vary depending on the type, degree of polymerization, structure, and the like of the polymer. According to one embodiment of the present invention, the thermoplastic polymer having a glass transition temperature of −40 to 250° C. and a pyrolysis temperature of 270 to 500° C. Since the distal end of the nozzle is kept higher than the average temperature of the nozzle, in some cases, the distal end of the nozzle may be provided with additional heating means.

The discharged thermoplastic polymer particles at the nozzle are fed to the cooling unit. The nozzle and the cooling unit can be spaced apart, in which case the discharged thermoplastic polymer particles are primarily cooled by ambient air before being supplied to the cooling unit. the hot air as well as the thermoplastic polymer particles are discharged together from the nozzle. By separating the nozzle and the cooling unit, the hot air can be discharged to the outside instead of the cooling unit, thereby increasing the cooling efficiency in the cooling unit. According to one embodiment of the present invention, the cooling unit is located spaced apart from the nozzle at a distance of 100 to 500 mm, preferably 150 to 400 mm, more preferably 200 to 300 mm. If the separation distance is shorter than the distance, a large amount of hot air is injected into the cooling chamber, thereby lowering the cooling efficiency. If the separation distance is longer than the distance, the amount cooled by the ambient air is increased, the rapid cooling by the cooling chamber is not achieved. In addition, the injection angle when discharging the thermoplastic polymer particles in the nozzle may be 10 to 60°. When discharging thermoplastic polymer particles at a corresponding angle, the effect of the separation between the nozzle and the cooling unit can be doubled.

The cooling unit cools the thermoplastic polymer particles by supplying low temperature air into the cooling unit to contact the air with the thermoplastic polymer particles. The low temperature air forms a rotary airflow in the cooling unit, and the rotational airflow can sufficiently secure the retention time of the thermoplastic polymer particles in the cooling unit. The flow rate of air supplied to the cooling unit may be adjusted depending on the supply amount of thermoplastic polymer particles. According to one embodiment of the present invention, the air may be supplied to the cooling unit at a flow rate of 1 to 10 m³/min. The air may preferably have a temperature of −30 to −20° C. By supplying cryogenic air into the cooling unit in comparison with the thermoplastic polymer particles supplied to the cooling unit, the thermoplastic polymer particles are rapidly cooled to properly maintain the internal structure of the high temperature thermoplastic polymer particles during discharge. The thermoplastic polymer particles are reheated again when actually applied for the manufacture of the product. At this time, the reheated thermoplastic polymer has physical properties that are advantageous for processing. The thermoplastic polymer particles cooled by low temperature air are cooled to 40° C. or less and discharged. The discharged particles are collected through a cyclone or a bag filter.

The manufacturing method of thermoplastic polymer particles according to the present invention can uniformly and effectively control physical properties such as the size and shape of the particles, without any additional ingredients besides the thermoplastic polymer resin, which is a raw material, and air. Therefore, in the particles produced by the manufacturing method according to the present invention, impurities other than thermoplastic polymer in the particles are effectively excluded, the internal physical properties as well as the external physical properties have been improved to facilitate processing when the particles are applied to products in various fields.

Hereinafter, preferred examples are provided to aid the understanding of the present invention. However, the following examples are provided only to more easily understand the present invention, but the present invention is not limited thereto.

EXAMPLES

Example 1: Manufacture of Polylactic Acid Particles According to the Manufacturing Method of the Present Invention 100 wt. % of polylactic acid resin (Natureworks, 2003D, Mw: about 200,000 g/mol, glass transition temperature ($T_g$): about 55° C., pyrolysis temperature ($T_d$): about 300° C.) was fed to a twin-screw extruder (diameter (D)=32 mm, length/diameter (L/D)=40). The twin-screw extruder was set to a temperature condition of about 220° C. and an extrusion amount condition of about 5 kg/hr, and then proceeded with extraction. The extruded polylactic acid resin has a viscosity of about 10 Pa·s. The extruded polylactic acid resin was supplied to a nozzle set to the internal temperature of about 300° C. and the distal end temperature of about 350° C. (A value according to Formula is about 1.2). In addition, air of about 350° C. was supplied to the nozzle at a flow rate of about 1 m³/min. The air was supplied to the central portion and the outer portion of the cross section of the nozzle, and the extruded polylactic acid resin was supplied between the central portion and the outer portion of the nozzle to which the air is supplied. The ratio of the cross-sectional areas of the air supplied to the outer portion and the extruded polylactic acid resin supplied between the central portion and the outer portion to which the air is supplied was about 4.5:1. The polylactic acid resin supplied to the nozzle was granulated by contact with hot air, and the granulated particles were ejected from the nozzle. The ejection angle from the nozzle was about 45° and the ejected particles were fed to a cooling chamber (diameter (D)=1,100 mm, length (L)=3,500 mm) spaced at a distance of about 200 mm from the nozzle. In addition, the cooling chamber was controlled to form a rotary airflow by injecting air at −25° C. at a flow rate of about 6 m³/min before the ejected particles are supplied. Particles sufficiently cooled down to 40° C. in the cooling chamber were collected through a cyclone or a bag filter.

Example 2: Manufacture of Polyurethane Particles According to the Manufacturing Method of the Present Invention Particles were prepared in the same manner as in Example 1, except that 100 wt. % of polyurethane resin (Lubrizol, Pearlthane™ D91M80, Mw: about 160,000 g/mol, glass transition temperature ($T_g$): about −37° C., pyrolysis temperature ($T_d$): about 290° C.) is used as a raw material.

Comparative Example 1: Manufacture of Polylactic Acid Particles by Freeze Grinding Method The same polylactic acid resin as in Example 1 was supplied to a screw feeder through a hopper. After removing the moisture while moving the raw material through the screw, the raw material was introduced into a crusher supplied with liquid nitrogen of −130° C. The crusher was a Pin Crusher-type crusher. Particle size was controlled via a crushing size determination pin. The particles granulated through the crusher were collected through a cyclone.

Experimental Example 1: Evaluation of Physical Properties of Particles

The physical properties of the particles manufactured according to Examples 1 and 2 and Comparative Example 1 were measured and shown in Table 1 below.

TABLE 1

| | Average particle diameter (μm)[1] | aspect ratio[2] | roundness[3] |
| --- | --- | --- | --- |
| Example 1 | 14.2 | 1.02 ± 0.01 | 0.98 ± 0.01 |
| Example 2 | 102.6 | 1.01 ± 0.01 | 0.99 ± 0.01 |
| Comparative Example 1 | 10.8 | 1.43 ± 0.41 | 0.74 ± 0.18 |

[1]The average particle diameter of the powder, which is an aggregate of particles, was derived using ImageJ (National Institutes of Health (NIH)) at room temperature. The major axis of each particle is the particle diameter. For the aggregate of particles, the number average value of each particle diameter is the average particle diameter.
[2]and [3]The formation of particles was analyzed by image-processing using the same device, and converting into a binary image and then digitizing the degree of spherical shape of individual particles, and the aspect ratio and roundness were derived by Formulas 1 and 2.

As shown in table 1, the thermoplastic polymer particles according to Examples 1 and 2 have a shape that is close to a sphere because the aspect ratio and roundness are measured close to 1, whereas the thermoplastic polymer particles according to Comparative Example 1 did not have a shape that is close to a sphere because the aspect ratio and roundness are measured to be slightly different from 1.

In the thermoplastic polymer particles prepared by the conventional freeze-crushing method as in Comparative Example 1, the aspect ratio and roundness do not satisfy the level close to a sphere, and thus the thermoplastic polymer particles are not easily handled later as compared to the thermoplastic polymer particles of Examples 1 and 2.

Experimental Example 2: DSC Analysis

The particles prepared according to Examples 1 and 2 and Comparative Example 1 were DSC analyzed, and the results are shown in Table 2 below. Specifically, DSC curves were obtained by increasing the temperature from 0° C. to 200° C. under the rate of temperature rise of 10° C./min using differential scanning calorimetry (DSC, Perkin-Elmer, DSC8000). The glass transition temperature (Tg), the melting point (Tm), cold crystallization temperature (Tcc), and the difference between endothermic amount (ΔH1) and exothermic amount (ΔH2) were derived from each DSC curve.

TABLE 2

|  | $T_g$ (° C.) | $T_m$ (° C.) | $T_{cc}$ (° C.) | ΔH1 − ΔH2 (J/g) |
|---|---|---|---|---|
| Example 1 | 55 | 140 | 98 | 36 |
| Example 2 | −37 | 136 | 34 | 6 |
| Comparative Example 1 | 59 | 146 | — | 42 |

According to Table 2, the thermoplastic polymer particles of Example 1 show a peak of the cold crystallization temperature at 98° C. and the thermoplastic polymer particles of Example 2 show a peak of the cold crystallization temperature at 34° C., whereas the thermoplastic polymer particles of Comparative Example 1 do not show a peak of such cold crystallization temperature.

Furthermore, it was confirmed that in the case of Example 1, the difference between the endothermic amount ΔH1 and the exothermic amount ΔH2 is about 36 J/g and in the case of Example 2, the difference between the endothermic amount ΔH1 and the exothermic amount ΔH2 is about 6 J/g. Unlike Example 1, it was confirmed that in the case of Comparative Example 1, the difference between the endothermic amount ΔH1 and the exothermic amount ΔH2 is about 42 J/g. It is understood that the polylactic acid particles of Example 1 have a relatively high exothermic amount because they have a property of generating heat before the particles are melted by the cold crystallization phenomenon.

If the thermoplastic polymer particles have a peak of cold crystallization temperature as in Examples 1 and 2, when performing the heating process using such particles, such particles may have an advantage that they can be processed at a low temperature, compared to the processing temperature of the thermoplastic polymer particles of Comparative Example 1.

Comparative Example 2: Manufacture of Polylactic Acid Particles by Solvent Polymerization The lactic acid was added to the xylene solvent and stirred, and then a tin-based catalyst and a polyol were added thereto and polymerized at a temperature of about 140° C. The polymer was dissolved in chloroform, precipitated in methanol, and then dried it finally to prepare polylactic acid particles having a size of 10 μm.

Comparative Example 3: Manufacture of Polyurethane Particles by Solvent Polymerization Method A prepolymer was synthesized by adding an ester or ether-based polyol to the dimethylformamide solvent and stirring it, and then adding diisocyanate. Subsequently, the polyurethane particles having a size of 400 μm were finally prepared by adding a diol or diamine-based chain extender, which is a single molecule reactive at a temperature of 80° C.

Experimental Example 3: Analysis of Impurities in Particles

The impurity content of the particles prepared according to Examples 1 and Comparative Examples 2 and 3 was analyzed, and the results are shown in Table 3 below. Specifically, the residual solvent in the particles was measured using a GC/FID device (manufacturer: Agilent, model name: 7890A), and the heavy metals in the particles were measured using an ICP/MS device (manufacturer: Perkinelmer, model name: Nexion300). The impurity content of Table 3 described below is the sum of the content of the residual solvent and the content of the heavy metals in the particles.

TABLE 3

|  | Impurity content (ppm) |
|---|---|
| Example 1 | 3 |
| Comparative Example 2 | 61 |
| Comparative Example 3 | 53 |

According to Table 3, it was confirmed that in the case of the particles of Comparative Example 2, since the solvent is used in the manufacture of the particles, the content of impurities is significantly higher than the particles of Example 1 due to the residual solvent in the particles. In contrast, the particles of Example 1 contained little impurities such as residual solvent except for trace impurities coming from the device during the manufacture of the particles.

All simple modifications or variations of the present invention fall within the scope of the present invention, and the specific scope of protection of the present invention will be clarified by the appended claims.

EXPLANATION OF SYMBOLS

10: Nozzle
20: Second air stream
30: Thermoplastic polymer resin stream
40: First air stream

The invention claimed is:

1. A method for manufacturing thermoplastic polymer particles comprising:
   (1) supplying a thermoplastic polymer resin to an extruder and extruding it;
   (2) supplying the extruded thermoplastic polymer resin and air to a nozzle, bringing the thermoplastic polymer resin into contact with air to granulate the thermoplastic polymer resin, and then discharging the granulated thermoplastic polymer resins; and
   (3) supplying the discharged thermoplastic polymer particles to a cooling unit to cool the thermoplastic polymer particles, and then collecting the cooled thermoplastic polymer particles;
   wherein in step (2), based on a cross section of the nozzle, the air is supplied to a central portion and an outer portion, and the extruded thermoplastic polymer resin is supplied between the central portion and the outer portion to which the air is supplied, and
   based on the cross section at the outlet of the nozzle, the ratio of the cross-sectional areas of the air supplied to the outer portion and the extruded thermoplastic polymer resin supplied between the central portion and the outer portion to which the air is supplied is 2:1 to 6:1, in step (3), the cooling unit is located away from the outlet of the nozzle so that the discharged thermoplastic polymer particles are primarily cooled by ambient air before being introduced into the cooling unit, and the cooling unit cools the thermoplastic polymer particles by air which has temperature of −30 to −20° C. and forms a rotary airflow.

2. The method for manufacturing thermoplastic polymer particles according to claim 1, wherein in step (1), an inside of the extruder is maintained at 150 to 450° C.

3. The method for manufacturing thermoplastic polymer particles according to claim 1, wherein in step (2), the extruded thermoplastic polymer resin supplied to the nozzle has a melt viscosity of 0.5 to 20 Pa·s.

4. The method for manufacturing thermoplastic polymer particles according to claim 1, wherein in step (2), the extruded thermoplastic polymer resin is supplied to the nozzle at a flow rate of 1 to 10 kg/hr, the air is supplied to the nozzle at a flow rate of 1 to 300 m³/hr.

5. The method for manufacturing thermoplastic polymer particles according to claim 1, wherein in step (2), the air is supplied to the nozzle at a temperature of 250 to 600° C.

6. The method for manufacturing thermoplastic polymer particles according to claim 1, wherein in step (2), an inside of the nozzle is maintained at 250 to 450° C.

7. The method for manufacturing thermoplastic polymer particles according to claim 6, wherein in step (2), a distal end of the nozzle is maintained at a temperature calculated by Formula below:

$$\text{Distal end temperature} = \text{glass transition temperature } (T_g) + (\text{pyrolysis temperature } (T_d) - \text{glass transition temperature } (T_g)) \times A,$$ [Formula]

wherein the glass transition temperature and the pyrolysis temperature are values for thermoplastic polymer, and A is 0.5 to 1.5.

8. The method for manufacturing thermoplastic polymer particles according to claim 1, wherein in step (2), a discharging angle of the thermoplastic polymer resin from the nozzle is 10 to 60°.

* * * * *